US012119185B2

(12) United States Patent
Ishimaru et al.

(10) Patent No.: US 12,119,185 B2
(45) Date of Patent: Oct. 15, 2024

(54) ELECTROLYTIC CAPACITOR AND METHOD FOR PRODUCING SAME

(71) Applicant: Panasonic Intellectual Property Management Co., Ltd., Osaka (JP)

(72) Inventors: Yoshiaki Ishimaru, Saga (JP); Yoshikazu Hirata, Saga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/813,605

(22) Filed: Jul. 20, 2022

(65) Prior Publication Data

US 2022/0375693 A1 Nov. 24, 2022

Related U.S. Application Data

(63) Continuation of application No. PCT/JP2021/003297, filed on Jan. 29, 2021.

(30) Foreign Application Priority Data

Jan. 30, 2020 (JP) ................................. 2020-013195

(51) Int. Cl.
*H01G 9/028* (2006.01)
*H01G 9/035* (2006.01)
*H01G 9/15* (2006.01)

(52) U.S. Cl.
CPC ............. *H01G 9/028* (2013.01); *H01G 9/035* (2013.01); *H01G 9/151* (2013.01)

(58) Field of Classification Search
None
See application file for complete search history.

(56) References Cited

U.S. PATENT DOCUMENTS

2008/0002334 A1 1/2008 Kakuma et al.
2008/0232035 A1 9/2008 Biler
(Continued)

FOREIGN PATENT DOCUMENTS

CN 101271770 A 9/2008
CN 103459495 A 12/2013
(Continued)

OTHER PUBLICATIONS

International Search Report of PCT application No. PCT/JP2021/003297 dated Apr. 20, 2021.
(Continued)

*Primary Examiner* — Eric W Thomas
(74) *Attorney, Agent, or Firm* — Rimon P.C.

(57) ABSTRACT

An electrolytic capacitor includes a capacitor element. The capacitor element includes an electrode group including an anode body, a cathode body, a separator, and an electrolyte layer. The anode body and the cathode body each has a foil shape. The anode body has a dielectric layer on a surface of the anode body. The electrolyte layer is in contact with the anode body, the cathode body, and the separator. The electrolyte layer contains a conductive polymer and a hydroxyl group-containing compound having a melting point of 50° C. or higher. The hydroxyl group-containing compound is at least one compound selected from the group consisting of a sugar and a polyhydric alcohol. The hydroxyl group-containing compound is unevenly distributed more in a peripheral portion of the capacitor element than in a central portion of the capacitor element.

11 Claims, 5 Drawing Sheets (56) References Cited

U.S. PATENT DOCUMENTS

| | | | |
|---|---|---|---|
| 2011/0080690 A1 | 4/2011 | Ning et al. | |
| 2012/0212880 A1 | 8/2012 | Ishimaru et al. | |
| 2014/0022705 A1 | 1/2014 | Tomioka et al. | |
| 2015/0287540 A1* | 10/2015 | Koseki | H01G 9/035 |
| | | | 427/80 |

FOREIGN PATENT DOCUMENTS

| | | | |
|---|---|---|---|
| JP | 2008-010657 | | 1/2008 |
| JP | 2008-235908 | | 10/2008 |
| JP | 2011171675 A | * | 9/2011 |
| JP | 2012-191178 | | 10/2012 |
| JP | 2013-138145 | | 7/2013 |
| JP | 2014-007422 | | 1/2014 |
| JP | 2014-090107 | | 5/2014 |
| JP | 2015-211176 A | | 11/2015 |
| WO | 2012/137969 | | 10/2012 |

OTHER PUBLICATIONS

English Translation of Chinese Office Action dated Jul. 5, 2024 for the related Chinese Patent Application No. 202180011047.6.

* cited by examiner

Before Step (ii)

FIG. 4B

After Step (ii)
in Capacitor A1

FIG. 4C

After Step (ii) in Capacitor C2

ELECTROLYTIC CAPACITOR AND METHOD FOR PRODUCING SAME

BACKGROUND

1. Technical Field

The present disclosure relates to an electrolytic capacitor and a method for manufacturing an electrolytic capacitor.

2. Description of the Related Art

Capacitors used in electronic devices are required to have a large capacitance and a small equivalent series resistance (ESR) value in a high frequency region. Promising candidates as large capacitance, and low ESR capacitors are electrolytic capacitors including a conductive polymer such as polypyrrole, polythiophene, polyfuran, or polyaniline. Unexamined Japanese Patent Publication No. 2008-10657 discloses a method of impregnating, with a dispersion containing a conductive polymer and a solvent, a capacitor element formed by winding an anode foil and a cathode foil with a separator interposed therebetween,

SUMMARY

An aspect of the present disclosure relates to a method for manufacturing an electrolytic capacitor. The manufacturing method is a method for manufacturing an electrolytic capacitor that includes an anode body and a cathode body each having a foil shape. The anode body includes a dielectric layer on a surface of the anode body. The method includes: a step (i) of forming a capacitor element precursor by winding or laminating a separator, the anode body, the cathode body, so that the anode body and the cathode body face each other with the separator interposed between the anode body and the cathode body; a step (ii) of disposing a hydroxyl group-containing compound having a melting point of 50° C. or higher inside the capacitor element precursor, the hydroxyl group-containing compound being at least one compound selected from the group consisting of a sugar and a polyhydric alcohol; and a step (iii) of forming a conductive polymer layer containing a conductive polymer inside the capacitor element precursor after the step (ii). The step (ii) includes a step (ii-a) of impregnating the capacitor element precursor with an aqueous treatment solution containing the hydroxyl group-containing compound, and a step (ii-b) of drying the aqueous treatment solution to dispose the hydroxyl group-containing compound inside the capacitor element precursor. The step (iii) includes a step (iii-a) of impregnating the capacitor element precursor with an aqueous dispersion liquid containing the conductive polymer after the step (ii), and a step (iii-b) of drying the aqueous dispersion liquid to form the conductive polymer layer. In the step (ii-b), the drying is performed at a predetermined temperature. The predetermined temperature is equal to or higher than a boiling point of the aqueous treatment solution and is lower than a melting point of the hydroxyl group-containing compound. Each of the boiling point of the aqueous treatment solution and the melting point of the hydroxyl group-containing compound is a value obtained at a pressure for performing the drying in the step (ii-b).

Another aspect of the present disclosure relates to a method for manufacturing an electrolytic capacitor. The manufacturing method is a method for manufacturing an electrolytic capacitor including an anode body that is porous and has a dielectric layer on a surface of the anode body. The method includes: a step (I) of disposing a hydroxyl group-containing compound having a melting point of 50° C. or higher on the surface of the anode body, the hydroxyl group-containing compound being at least one compound selected from the group consisting of a sugar and a polyhydric alcohol; and a step (II) of forming a conductive polymer layer containing a conductive polymer on the anode body after the step (I). The step (I) includes a step (I-a) of impregnating the anode body with an aqueous treatment solution containing the hydroxyl group-containing compound, and a step (I-b) of drying the aqueous treatment solution to dispose the hydroxyl group-containing compound on the surface of the anode body. The step (II) includes a step (II-a) of impregnating the anode body with an aqueous dispersion liquid containing a conductive polymer after the step (I), and a step (II-b) of drying the aqueous dispersion liquid to form the conductive polymer layer on the anode body. In the step (I-b), the drying is performed at a predetermined temperature. The predetermined temperature is equal to or higher than a boiling point of the aqueous treatment solution and is lower than a melting point of the hydroxyl group-containing compound. Each of the boiling point of the aqueous treatment solution and the melting point of the hydroxyl group-containing compound is a value obtained at a pressure for performing the drying in the step (I-b).

Still another aspect of the present disclosure relates to an electrolytic capacitor. The electrolytic capacitor is an electrolytic capacitor including a capacitor element. The capacitor element includes an electrode group and an electrolyte layer. The electrode group includes an anode body, a cathode body, and a separator. The anode body and the cathode body each has a foil shape. The anode body has a dielectric layer on a surface of the anode body. The electrolyte layer is in contact with the anode body, the cathode body, and the separator. The electrode group is a wound body in which the anode body and the cathode body facing each other are wound with the separator interposed between the anode body and the cathode body, or a laminate in which the anode body and the cathode body facing each other are laminated with the separator interposed between the anode body and the cathode body. The electrolyte layer contains a conductive polymer and a hydroxyl group-containing compound having a melting point of 50° C. or higher. The hydroxyl group-containing compound is at least one compound selected from the group consisting of a sugar and a polyhydric alcohol. The hydroxyl group-containing compound is unevenly distributed more in a peripheral portion of the capacitor element than in a central portion of the capacitor element.

Still another aspect of the present disclosure relates to an electrolytic capacitor. The electrolytic capacitor is an electrolytic capacitor including a capacitor element. The capacitor element includes an anode body, a cathode layer, and an electrolyte layer. The anode body is porous and has a dielectric layer on a surface of the anode body. The electrolyte layer is disposed between the anode body and the cathode layer. The capacitor element contains a conductive polymer and a hydroxyl group-containing compound having a melting point of 50° C. or higher. The hydroxyl group-containing compound is at least one compound selected from the group consisting of a sugar and a polyhydric alcohol. The hydroxyl group-containing compound is unevenly distributed more in a peripheral portion of the anode body than in a central portion of the anode body.

According to the present disclosure, an electrolytic capacitor with superior characteristics is obtained.

DETAILED DESCRIPTIONS OF EMBODIMENTS

Recently, an electrolytic capacitor having superior characteristics (particularly, high withstand voltage and high reliability) is required. In such a circumstance, the present disclosure provides an electrolytic capacitor having superior characteristics and a method for manufacturing the electrolytic capacitor.

Hereinafter, an exemplary embodiment of the present disclosure will be described with reference to examples, but the present disclosure is not limited to the examples described below. In the following description, specific numerical values and materials may be provided as examples, but other numerical values and materials may be applied as long as the effect of the present disclosure can be obtained. In the following description, a melting point is a value at 1 atm unless otherwise specified. A viscosity is a value at room temperature (25° C.) and 1 atm unless otherwise specified.

As a result of studies, the inventors of the present application have found that an electrolytic capacitor having superior characteristics is obtainable by disposing a conductive polymer in a capacitor element precursor by a specific method. The present disclosure has been based on this new finding.

The electrolytic capacitor of the present disclosure may be explained as a first electrolytic capacitor described below or a second electrolytic capacitor described below. These will be described below in order.

[First Electrolytic Capacitor]

The first electrolytic capacitor is an electrolytic capacitor including a capacitor element. The capacitor element includes an electrode group and an electrolyte layer. The electrode group includes an anode body having a foil shape and having a dielectric layer on a surface of the anode body, a cathode body having a foil shape, and a separator. The electrolyte layer is in contact with the anode body, the cathode body, and the separator. The electrode group may be a wound body in which the anode body, the cathode body, and the separator are wound so as to dispose the separator between the anode body and the cathode body. Alternatively, the electrode group is a laminate in which the anode body, the cathode body, and the separator are laminated in a zigzag manner so as to dispose the separator between the anode body and the cathode body. The electrolyte layer contains a conductive polymer and a hydroxyl group-containing compound that is at least one compound selected from the group consisting of a sugar and a polyhydric alcohol and has a melting point of 50° C. or higher. The hydroxyl group-containing compound may be referred to "hydroxyl group-containing compound (C)" in the description below. The hydroxyl group-containing compound (C) is unevenly distributed more in a peripheral portion of the capacitor element than in a central portion of the capacitor element.

The electrolyte layer of the first electrolytic capacitor contains the hydroxyl group-containing compound (C). Fixability of the conductive polymer is improved by the hydroxyl group of the hydroxyl group-containing compound (C). As a result, preferable characteristics (particularly, low ESR) can be achieved. Since the stability of the electrolyte layer is enhanced by improving the fixability of the conductive polymer, the reliability of the electrolytic capacitor can be improved.

In the peripheral portion of the capacitor element, defects of the dielectric layer (oxide film) of the anode body easily occur. By disposing the hydroxyl group-containing compound (C) having a plurality of hydroxyl groups in this portion, defects of the dielectric layer are easily repaired. As a result, an electrolytic capacitor having high reliability is obtainable. Specifically, an electrolytic capacitor that has a high breakdown withstand voltage and hardly causes a short circuit is obtained.

By unevenly distributing the hydroxyl group-containing compound (C) much in the peripheral portion of the capacitor element, the conductive polymer can be unevenly distributed much in the peripheral portion. That is, the conductive polymer layer in the peripheral portion can be formed thick.

The electrode group of the first electrolytic capacitor is not particularly limited, and a known electrode group may be used. For example, as the electrode group that is the wound body, an electrode group used for a general wound electrolytic capacitor may be used. Similarly, as the electrode group that is the laminate, an electrode group used for a general laminated electrolytic capacitor may be used. For example, the electrode group that is the laminate includes a laminate in which a foil-shaped anode body, a foil-shaped cathode body, and a separator are stacked by being folded in a zigzag manner. At this time, the foil-shaped anode body, the foil-shaped cathode body, and the separator are disposed such that the separator exists between the anode body and the cathode body. Examples of the foil-shaped anode body, the foil-shaped cathode body, and the separator will be described below.

(Hydroxyl Group-Containing Compound (C))

The hydroxyl group-containing compound (C) contained in the electrolyte layer of the first electrolytic capacitor will be described below. The hydroxyl group-containing compound (C) is at least one compound selected from the group consisting of a sugar and a polyhydric alcohol and having a melting point of 50° C. or higher. The melting point of the hydroxyl group-containing compound (C) is preferably higher than the temperature at the time of using the capacitor. The melting point of the hydroxyl group-containing compound (C) may range from 80° C. to 300° C., inclusive (for example, from 120° C. to 300° C., inclusive).

Examples of the sugar include glucose. Examples of the polyhydric alcohol include mannitol, sorbitol, xylitol, pentaerythritol, and trimethylolpropane. Mannitol, sorbitol, xylitol, pentaerythritol, and the like may be referred to as sugar alcohols. The hydroxyl group-containing compound may be a sugar alcohol.

The number of hydroxyl groups in the hydroxyl group-containing compound (C) may range from 2 to 12, inclusive (for example, from 3 to 6, inclusive). Usually, the hydroxyl group-containing compound (C) is a water-soluble compound.

From another viewpoint, as the hydroxyl group-containing compound contained in the electrolyte layer of the first electrolytic capacitor, an organic compound (for example, an organic compound that is not a polymer) containing a plurality of hydroxyl groups (—OH) bonded to a carbon atom and having a melting point in the above range may be used. The molecular weight of the organic compound and the number of hydroxyl groups in the organic compound may each fall in the above ranges exemplified for the hydroxyl group-containing compound.

The hydroxyl group-containing compound (C) may be at least one selected from the group consisting of glucose, mannitol, sorbitol, xylitol, pentaerythritol, and trimethylolpropane. The melting point of glucose is about 146° C. to 150° C., the melting point of mannitol is about 165° C. to 169° C., the melting point of sorbitol is about 93° C. to 95° C., the melting point of xylitol is about 92° C. to 97° C., the melting point of pentaerythritol is about 257° C. to 260° C., and the melting point of trimethylolpropane is about 56° C. to 58° C. The melting points of these substances may vary depending on the structure (stereoisomer). Glucose, mannitol, and pentaerythritol are preferred in terms of a high melting point.

(Conductive Polymer)

The conductive polymer used in the first electrolytic capacitor will be described below. Examples of the conductive polymer include polypyrrole, polythiophene, polyaniline, and derivatives thereof. The derivatives include polymers having polypyrrole, polythiophene, polyfuran, polyaniline, and polyacetylene as a basic skeleton. For example, the derivative of polythiophene includes poly(3,4-ethylenedioxythiophene) and the like. These conductive polymers may be used singly or in combination of two or more kinds thereof. Alternatively, the conductive polymer may be a copolymer of two or more types of monomers. The weight average molecular weight of the conductive polymer is not particularly limited, and may range, for example, from 1000 to 100000, inclusive. A preferred example of the conductive polymer is poly(3,4-ethylenedioxythiophene) (PEDOT).

A dopant may be added to the conductive polymer. It is preferable to use a polymer dopant, in view of suppressing the dedoping of the dopant from the conductive polymer. Examples of the polymer dopant include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used singly or in combination of two or more kinds thereof. These may be added in the form of a salt. The polymer dopant may be present in the electrolyte in the form of an anion in which a cation (for example, a proton) is dissociated from at least a part of an acidic group. A preferred example of the dopant is polystyrenesulfonic acid (PSS).

The weight average molecular weight of the dopant is not particularly limited. From the viewpoint of facilitating the formation of a homogeneous electrolyte layer, the weight average molecular weight of the dopant may range from 1000 to 100000, inclusive.

The conductive polymer may be poly(3,4-ethylenedioxythiophene) doped with polystyrenesulfonic acid.

The electrode group of the first electrolytic capacitor may be a wound body. In this case, it is preferable that the electrolyte layer has an unevenly distributed portion in which the hydroxyl group-containing compound is unevenly distributed much at both ends in a winding axis direction of the wound body and at an outermost circumference portion of the wound body. In both ends in the winding axis direction of the wound body and in the outermost circumference portion of the wound body, defects of the dielectric layer (oxide film) of the anode body easily occur. By unevenly distributing the hydroxyl group-containing compound (C) much in these portions, repair of defects of the dielectric layer can be enhanced.

The anode body and the cathode body of the first electrolytic capacitor usually have a rectangular planar shape. In this case, the vicinities of both ends in the winding axis direction of the wound body can be regarded as the vicinities of the long sides of the anode body and the cathode body that have a rectangular shape.

The electrode group of the first electrolytic capacitor may be a laminate. In this case, the electrolyte layer has an unevenly distributed portion in which the hydroxyl group-containing compound is unevenly distributed much at a portion in contact with the peripheral portion of the anode body. Since defects of the dielectric layer (oxide film) of the anode body easily occur in the peripheral portion of the anode body, it is preferable to unevenly distribute the hydroxyl group-containing compound (C) much in these portions.

The electrolyte layer of the first electrolytic capacitor may contain a non-aqueous solvent or a non-aqueous electrolytic solution. Hereinafter, the non-aqueous solvent and the non-aqueous electrolytic solution contained in the electrolyte layer may be collectively referred to "liquid component (L)". The liquid component (L) may be a substance that is a liquid at room temperature (25° C.), or may be a substance that is a liquid at a temperature at which the first electrolytic capacitor is used. A preferred example of the liquid component (L) is a liquid in which the hydroxyl group-containing compound (C) is not substantially dissolved.

The non-aqueous solvent may be an organic solvent or may be an ionic liquid. Examples of the non-aqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2 pyrrolidone, esters such as methyl acetate, carbonate compounds such as propylene carbonate, ethers such as 1,4-dioxane, ketones such as methyl ethyl ketone, and formaldehyde.

As the non-aqueous solvent, a polymer solvent may be used. Examples of the polymer solvent include polyalkylene glycol, a derivative of the polyalkylene glycol, and a compound obtained by substituting at least one hydroxyl group of a polyhydric alcohol with polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Further, examples of the polymer solvent include an ethylene glycol-propylene glycol copolymer, an ethylene glycol-butylene glycol copolymer, and a propylene glycol-butylene glycol copolymer. One of these non-aqueous solvents may be used singly, or two or more thereof may be used in mixture.

The liquid component (L) may contain an acid component and a base component. Examples of the acid component include maleic acid, phthalic acid, benzoic acid, pyromellitic acid, and resorcinic acid. Examples of the base component include 1,8-diazabicyclo[5,4,0]undecene-7,1,5-diazabicyclo[4,3,0]nonene-5,1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole.

The non-aqueous electrolytic solution contains a non-aqueous solvent and a solute (for example, an organic salt) dissolved in the non-aqueous solvent. Examples of the non-aqueous solvent constituting the non-aqueous electrolytic solution include the above-described examples of the non-aqueous solvent. Examples of the solute include an inorganic salt and an organic salt. The organic salt is a salt in which at least one of an anion and a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

In order to suppress the dedoping of the dopant, the pH of the liquid component (L) may be set to less than 7 or may be set to 5 or less.

(Anode Body)

As the anode body, a metal foil having a dielectric layer formed on a surface of the metal foil can be used. The type of metal constituting the metal foil is not particularly limited. From the viewpoint of easy formation of the dielectric layer, examples of metal constituting the metal foil include a valve metal, such as aluminum, tantalum, niobium, or titanium, and an alloy of a valve metal. Preferred examples are aluminum and an aluminum alloy. Usually, the surface of the anode body is roughened, and the dielectric layer is formed on the roughened surface. The electrolyte layer is in contact with the dielectric layer of the anode body.

(Cathode Body)

As the cathode body, a metal foil can be used. The type of metal constituting the metal foil is not particularly limited. Examples of metal constituting the metal foil include a valve metal, such as aluminum, tantalum, niobium, or titanium, and an alloy of a valve metal. Preferred examples are aluminum and an aluminum alloy. On a surface of the cathode body may be provided an anodization film, a film of a metal different from the metal that constitutes the cathode body (different type of metal), or a nonmetal film. Examples of the different type of metal and the nonmetal include metals such as titanium and nonmetals such as carbon.

(Separator)

As the separator, a sheet-shaped material that may be impregnated with an electrolyte can be used, and for example, a sheet-shaped material that has insulating properties and may be impregnated with an electrolyte may be used. The separator may be a woven fabric, a nonwoven fabric, or a porous membrane. Examples of a material for the separator include cellulose, polyethylene terephthalate, polybutylene terephthalate, polyphenylenesulfide, vinylon, nylon, aromatic polyamide, polyimide, polyamideimide, polyetherimide, rayon, and glass.

The electrolyte of the electrolytic capacitor of the present disclosure contains the hydroxyl group-containing compound (C). The strength of the separator can be improved by this hydroxyl group-containing compound (C). In an electrolytic capacitor of the related art, when a separator having a weak strength (for example, a separator made of cellulose-based natural fibers such as Manila hemp and esparto) is used, characteristics such as withstand voltage of the capacitor may be deteriorated. Deterioration of such characteristics can be suppressed by using a hydroxyl group-containing compound (C). The effect of reinforcing the separator can be obtained regardless of the type of the separator.

[Second Electrolytic Capacitor]

The second electrolytic capacitor is an electrolytic capacitor including a capacitor element. The capacitor element includes a porous anode body that has a dielectric layer on a surface of the anode body, a cathode layer, and an electrolyte layer disposed between the anode body and the cathode layer. The capacitor element contains a conductive polymer and a hydroxyl group-containing compound that is at least one compound selected from the group consisting of a sugar and a polyhydric alcohol and has a melting point of 50° C. or higher. The hydroxyl group-containing compound is unevenly distributed more in a peripheral portion of the anode body than in a central portion of the anode body. As the hydroxyl group-containing compound used in the second electrolytic capacitor, the compounds exemplified for the hydroxyl group-containing compound of the first electrolytic capacitor can be used. Thus, the hydroxyl group-containing compound used in the second electrolytic capacitor may be also referred to "hydroxyl group-containing compound (C)".

The porous anode body may have a columnar shape (for example, a cylindrical shape or a prismatic shape) or a plate shape. The porous anode body is usually a sintered body formed by sintering as described below. In these porous anode bodies, peripheral portions are likely to be lost. In the second electrolytic capacitor, by disposing the hydroxyl group-containing compound (C) much at the peripheral portion of the porous anode body, the loss of the peripheral portion can be suppressed. Thus, an electrolytic capacitor with superior characteristics is obtained. The hydroxyl group-containing compound (C) is present in the peripheral portion of the anode body (that is, near the interface between the electrolyte layer and the anode body of the second electrolytic capacitor). Hence, the effects described in the first electrolytic capacitor can be obtained.

By unevenly distributing the hydroxyl group-containing compound (C) much in the peripheral portion of the anode body, the conductive polymer can be unevenly distributed much in the peripheral portion. That is, the conductive polymer layer in the peripheral portion can be formed thick.

The hydroxyl group-containing compound (C) used in the second electrolytic capacitor may be at least one selected from the group consisting of glucose, mannitol, sorbitol, xylitol, pentaerythritol, and trimethylolpropane.

The electrolyte layer of the second electrolytic capacitor may be a solid electrolyte layer. The electrolyte layer may be formed using a manganese compound or a conductive polymer. As the conductive polymer, the conductive polymer described for the electrolyte layer of the first electrolytic capacitor may be used. For example, the conductive polymer may be poly(3,4-ethylenedioxythiophene) doped with polystyrenesulfonic acid.

The electrolyte layer containing the conductive polymer (for example, a solid electrolyte layer) may be formed by polymerizing a raw material monomer on the dielectric layer of the anode body. Alternatively, the electrolyte layer may be formed by applying, to the dielectric layer of the anode body, a liquid containing the conductive polymer. The electrolyte layer may include one layer or may include two or more layers of different materials.

The anode body, the cathode layer, and the electrolyte layer of the second electrolytic capacitor are not particularly limited, except for the matters related to the hydroxyl group-containing compound (C). For example, the anode body, the cathode layer, and the electrolyte layer of the second electrolytic capacitor may be formed using a material and a technique used for a known electrolytic capacitor including a porous anode body. The anode body and the cathode layer of the second electrolytic capacitor will be described below.

The porous anode body may be, for example, a porous sintered body obtained by sintering material particles containing a valve metal. The anode body may have a rectangular parallelepiped shape. Examples of the valve metal include titanium (Ti), tantalum (Ta), and niobium (Nb). The material particles may be made of an alloy containing a valve metal. For example, an alloy containing the valve metal, and silicon, vanadium, boron, and the like may be used. The alloy of the valve metal contains the valve metal as a main component and contains, for example, the valve metal at a proportion of 50 atom % or more. Alternatively, material particles of a compound containing the valve metal and a typical element such as nitrogen may be used. One of these material particles may be used alone, or two or more of these materials may be mixed for use.

The anode body includes a dielectric layer on a surface of the anode body. Thus, the electrolyte layer is in contact with the dielectric layer of the anode body. The dielectric layer is formed, for example, by subjecting a sintered body, which is to be an anode body, to an anodizing treatment so that an oxide film is grown on the surface of the sintered body.

The cathode layer has a current collecting function. The cathode layer is formed, for example, using a conductive material. The cathode layer may be a conductive layer formed to cover the electrolyte layer. The cathode layer may include a carbon layer formed to cover the electrolyte layer and a metal paste layer formed on the carbon layer. The carbon layer may contain conductive carbon material such as graphite and resin. The metal paste layer may contain metal particles (for example, silver) and a resin.

As an example of the method of the present disclosure for manufacturing an electrolytic capacitor, first and second manufacturing methods will be described below. According to these manufacturing methods, the electrolytic capacitor of the present disclosure can be manufactured. The matters described for the electrolytic capacitor of the present disclosure can be applied to the following manufacturing method, and thus redundant description may be omitted. For example, the constituent elements of the electrolytic capacitor of the present disclosure (constituent elements of the anode body, the cathode body or the cathode layer, the separator, and the electrolyte layer) have been described above, and thus redundant description may be omitted. Specifically, the hydroxyl group-containing compound (C), the conductive polymer, the separator, the liquid component (L), and the like have been described above, and thus redundant description may be omitted. The matters described below can be applied to the electrolytic capacitor of the present disclosure described above.

[First Manufacturing Method for Electrolytic Capacitor]

According to the first manufacturing method, the first electrolytic capacitor can be manufactured. The first manufacturing method is a method for manufacturing an electrolytic capacitor that includes a foil-shaped cathode body and a foil-shaped anode body having a dielectric layer on a surface of the anode body. This first manufacturing method includes the following steps (i) to (iii).

(Step (i))

The step (i) is a step of forming a capacitor element precursor that includes a separator, an anode body, and a cathode body. The anode body and the cathode body each have a foil shape and face each other with the separator disposed between the anode body and the cathode body. The capacitor element precursor is a capacitor element before an electrolyte layer is formed.

The foil-shaped anode body may be formed by a known method. For example, first, a metal foil as a raw material for the anode body is prepared, and the surface of the metal foil is roughened. The roughening can be performed, for example, by etching using a direct current electrolyzing method or an alternating current electrolyzing method. Next, the dielectric layer is formed on the roughened surface of the metal foil. The dielectric layer can be formed, for example, by subjecting the metal foil to an anodizing treatment. Through the anodizing treatment of the metal foil, the surface of the metal foil is oxidized to form the dielectric layer that is an oxide film. Thus, the anode body is formed.

As necessary, a lead terminal for electrical connection is connected to each of the anode body and the cathode body.

When the first electrolytic capacitor is a wound-type capacitor, a capacitor element precursor can be formed, for example, by collectively winding a foil-shaped anode body, a foil-shaped cathode body, and a separator. At this time, the anode body, the cathode body, and the separator are wound to dispose the separator between the anode body and the cathode body.

When the capacitor element is a laminated-type capacitor, a capacitor element precursor can be formed, for example, by collectively folding a foil-shaped anode body, a foil-shaped cathode body, and a separator in a zigzag manner. At this time, the anode body, the cathode body, and the separator are folded to dispose the separator between the anode body and the cathode body.

(Step (ii))

The step (ii) is a step of disposing a hydroxyl group-containing compound (hydroxyl group-containing compound (C)) inside the capacitor element precursor. The hydroxyl group-containing compound is at least one compound selected from the group consisting of a sugar and a polyhydric alcohol and has a melting point of 50° C. or higher. The step (ii) may be a step of precipitating the hydroxyl group-containing compound (C) inside the capacitor element precursor. Thus, in the following description, "disposing" may be read as "precipitating".

The step (ii) includes a step (ii-a) and a step (ii-b). The step (ii-a) is a step of impregnating the capacitor element precursor with an aqueous treatment solution containing the hydroxyl group-containing compound (C).

The step (ii-a) can be performed, for example, by immersing the capacitor element precursor in the aqueous treatment solution. The immersion time is not limited, and may be 1 minute or longer and shorter than 20 minutes. The entire capacitor element precursor may be immersed in the aqueous treatment solution, or only a part of the capacitor element precursor may be immersed in the aqueous treatment solution. For example, only 50% or less of the capacitor element precursor in a longitudinal direction (axial direction in the case of a wound body) may be immersed in the aqueous treatment solution.

The step (ii-a) may be performed at room temperature, or may be performed at a temperature other than the room temperature (for example, a temperature higher than room temperature). The step (ii-a) may be performed under atmospheric pressure, or may be performed in an environment other than the atmospheric pressure (for example, under reduced pressure).

The aqueous treatment solution is a treatment solution containing water. The proportion of water in the liquid (solvent) constituting the aqueous treatment solution ranges, for example, from 50 mass % to 100 mass %, inclusive. Usually, the hydroxyl group-containing compound (C) is dissolved in the aqueous treatment solution. That is, the aqueous treatment solution may be a solution in which the hydroxyl group-containing compound (C) is dissolved. In a typical example, the aqueous treatment solution is an aqueous solution of the hydroxyl group-containing compound (C).

The content proportion (concentration) of the hydroxyl group-containing compound (C) in the aqueous treatment solution (an aqueous solution of the hydroxyl group-containing compound (C)) may range from 3 mass % to 50 mass %, inclusive (for example, from 5 mass % to 15 mass %, inclusive). The aqueous treatment solution may contain a component other than the hydroxyl group-containing compound (C), as necessary.

The aqueous treatment solution may contain a polymer, but it is preferable that the aqueous treatment solution does not contain a polymer. For example, the aqueous treatment solution may not contain the conductive polymer. Since the viscosity of the aqueous treatment solution not containing a polymer is low, the impregnation into the capacitor element precursor becomes easier. The polymer described herein means a polymer having a weight average molecular weight of 1000 or more.

The step (ii-b) is a step of drying the impregnated aqueous treatment solution to dispose the hydroxyl group-containing compound (C) inside the capacitor element precursor. The step (ii-b) may be performed under atmospheric pressure, or may be performed in an environment other than the atmospheric pressure (for example, under reduced pressure).

Drying in the step (ii-b) is performed at a predetermined temperature (T). The predetermined temperature (T) is a temperature (for example, 100° C. or higher, 120° C. or higher, or 125° C. or higher) equal to or higher than the boiling point of the aqueous treatment solution under the pressure for performing the drying in the step (ii-b) and a temperature lower than the melting point of the hydroxyl group-containing compound (C) under the pressure for performing the drying in the step (ii-b). Since a change in melting point by changing pressure is small, the melting point of the hydroxyl group-containing compound (C) at 1 atm can be regarded as the melting point of the hydroxyl group-containing compound (C) under the pressure for performing the drying in the step (ii-b).

As a result of studies, the inventors of the present application have found that, by changing the drying conditions of the step (ii-b), the hydroxyl group-containing compound (C) can be unevenly distributed more in the peripheral portion of the capacitor element precursor than in the central portion of the capacitor element precursor. Thus, the hydroxyl group-containing compound (C) can be unevenly distributed much in the peripheral portion of the capacitor element manufactured by this manufacturing method. In the peripheral portion of the capacitor element, defects of the dielectric layer (oxide film) of the anode body easily occur. By disposing the hydroxyl group-containing compound (C) having a plurality of hydroxyl groups in this portion, defects of the dielectric layer are easily repaired. As a result, an electrolytic capacitor having high reliability is obtainable. Specifically, an electrolytic capacitor that has a high breakdown withstand voltage and hardly causes a short circuit is obtained.

The step (ii) may be repeatedly performed as necessary. The amount of the hydroxyl group-containing compound (C) to be precipitated can be increased by repeating the step (ii).

(Step (iii))

The step (iii) is a step of forming a conductive polymer layer containing a conductive polymer inside the capacitor element precursor after the step (ii). The conductive polymer layer is a layer that may be the electrolyte layer of the first electrolytic capacitor.

The step (iii) includes a step (iii-a) and a step (iii-b). The step (iii-a) is a step of impregnating the capacitor element precursor with an aqueous dispersion liquid containing the conductive polymer after the step (ii).

The step (iii-a) can be performed, for example, by immersing the capacitor element precursor in the aqueous dispersion liquid. The immersion time is not limited, and may be from 1 second to 30 minutes, inclusive. The entire capacitor element precursor may be immersed in the aqueous dispersion liquid, or only a part of the capacitor element precursor may be immersed in the aqueous dispersion liquid. For example, only 50% or less of the capacitor element precursor in a longitudinal direction (axial direction in the case of a wound body) may be immersed in the aqueous dispersion liquid.

The step (iii-a) may be performed at room temperature, or may be performed at a temperature other than the room temperature (for example, a temperature higher than room temperature). The step (iii-a) may be performed under atmospheric pressure, or may be performed in an environment other than the atmospheric pressure (for example, under reduced pressure).

The aqueous dispersion liquid is a treatment solution containing water. The proportion of water in the aqueous liquid (dispersion medium) constituting the aqueous dispersion liquid ranges, for example, from 2 mass % to 100 mass %, inclusive. The aqueous liquid may be water. The conductive polymer is dispersed in the aqueous liquid. That is, the aqueous dispersion liquid is a suspension liquid in which the conductive polymer is dispersed in the aqueous liquid.

The content proportion (concentration) of the conductive polymer in the aqueous dispersion liquid may range from 0.1 mass % to 20 mass %, inclusive (for example, from 0.5 mass % to 3 mass %, inclusive).

The viscosity of the aqueous dispersion liquid may range from 1 mPa·s to 100 mPa·s, inclusive, or may range from 1 mPa·s to 40 mPa·s, inclusive (for example, from 1 mPa·s to 25 mPa·s, inclusive). The lower the viscosity of the aqueous dispersion liquid, the easier the impregnation into the capacitor element precursor.

It is preferable that the aqueous dispersion liquid does not contain the hydroxyl group-containing compound (C). When the hydroxyl group-containing compound (C) is not added to the aqueous dispersion liquid, the viscosity of the aqueous dispersion liquid can be reduced. Even when the aqueous dispersion liquid contains the hydroxyl group-containing compound (C), the hydroxyl group-containing compound (C) is preferably contained in a range in which the viscosity of the aqueous dispersion liquid is less than or equal to a certain value (for example, 40 mPa·s or less or 25 mPa·s or less).

As described above, a dopant may be added to the conductive polymer. The aqueous dispersion liquid may contain a component other than the conductive polymer and the dopant, as necessary.

The step (iii-b) is a step of drying the impregnated aqueous dispersion liquid to form the conductive polymer layer. Typically, the conductive polymer layer contains the conductive polymer as a main constituent element.

The method for drying the aqueous dispersion liquid is not particularly limited. The step (iii-b) may be performed under atmospheric pressure, or may be performed in an environment other than the atmospheric pressure (for example, under reduced pressure). In the step (iii-b), usually at least heating is performed. The heating temperature in the step (iii-b) may satisfy condition (1) and/or condition (2) described below.

(1) The heating temperature in the step (iii-b) is a temperature equal to or higher than the boiling point of the aqueous dispersion liquid under the pressure for performing the drying in the step (iii-b) and a temperature lower than the melting point of the hydroxyl group-containing compound (C) under the pressure for performing the drying in the step (iii-b).

(2) The heating temperature in the step (iii-b) is higher than the heating temperature in the step (ii-b).

In order to realize superior characteristics (for example, low ESR), it is necessary to increase the content proportion of the conductive polymer in the electrolyte layer. For this purpose, it is important to enhance the fixability of the conductive polymer. As one of methods for enhancing the fixability of the conductive polymer, it is considered to add a polyhydric alcohol or the like to the aqueous dispersion liquid of the conductive polymer. However, when a polyhydric alcohol or the like is added to the aqueous dispersion liquid, the viscosity of the aqueous dispersion liquid increases, and thus impregnation with the aqueous dispersion liquid becomes difficult. In the manufacturing method of the present disclosure, after the treatment with the aqueous treatment solution containing the hydroxyl group-containing compound (C) is performed, impregnation with the aqueous dispersion liquid is performed. Hence, impregnation with the aqueous dispersion liquid becomes easy. By disposing the hydroxyl group-containing compound (C) inside the capacitor element precursor in advance, the conductive polymer to be impregnated thereafter can be firmly fixed. As a result, an electrolytic capacitor with superior characteristics can be manufactured.

As described above, the electrolyte layer is formed. That is, the capacitor element including the electrolyte layer is formed as described above.

The electrolytic capacitors (first and second electrolytic capacitors) of the present disclosure can be manufactured using the capacitor element obtained as described above. The method for manufacturing an electrolytic capacitor using a capacitor element is not particularly limited, and a known method may be applied. For example, a capacitor element may be put in a case and then sealed.

[Second Manufacturing Method for Electrolytic Capacitor]

According to the second manufacturing method, the second electrolytic capacitor can be manufactured. The second manufacturing method is a method for manufacturing an electrolytic capacitor including a porous anode body that has a dielectric layer on a surface of the anode body. This second manufacturing method includes a step (I) and a step (II).

(Step (I))

The step (I) is a step of disposing a hydroxyl group-containing compound (C) on the surface of the anode body. The hydroxyl group-containing compound is at least one compound selected from the group consisting of a sugar and a polyhydric alcohol and has a melting point of 50° C. or higher. As the porous anode body that has a dielectric layer on a surface of the anode body, those described for the second electrolytic capacitor can be used.

The step (I) includes a step (I-a) and a step (I-b). The step (I-a) is a step of impregnating the anode body with an aqueous treatment solution containing the hydroxyl group-containing compound (C). The step (I-a) can be performed under the same conditions as in the step (ii-a), except that the anode body is used instead of the capacitor element precursor. For example, as the aqueous treatment solution, the aqueous treatment solution described in the step (ii-a) can be used.

The step (I-b) is a step of drying the impregnated aqueous treatment solution to dispose the hydroxyl group-containing compound (C) on the surface of the anode body. Drying in the step (I-b) is performed at a predetermined temperature. The predetermined temperature is a temperature equal to or higher than the boiling point of the aqueous treatment solution under the pressure for performing the drying in the step (I-b) and a temperature lower than the melting point of the hydroxyl group-containing compound (C) under the pressure for performing the drying in the step (I-b). The drying in the step (I-b) can be performed under the same conditions as in the drying described in the step (ii-b).

(Step (II))

The step (II) is a step of forming a conductive polymer layer containing a conductive polymer on the anode body (on the dielectric layer of the anode body) after the step (I).

The step (II) includes a step (II-a) and a step (II-b). The step (II-a) is a step of impregnating the anode body with an aqueous dispersion liquid containing a conductive polymer after the step (I). The step (II-a) can be performed under the same conditions as in the step (iii-a), except that the anode body is used instead of the capacitor element precursor. For example, as the aqueous dispersion liquid, the aqueous dispersion liquid described in the step (iii-a) can be used.

When the conductive polymer is dispersed in a dispersion medium in a particulate form, the average particle diameter of the particles may range from 0.1 μm to 0.5 μm, inclusive. When the average particle diameter of the particles is in this range, the particles easily enter inside the anode body. The average particle diameter described herein is a median diameter ($D_{50}$) at which a cumulative volume reaches 50% in a volume-based particle size distribution. The median diameter is determined, for example, using a laser diffraction and scattering type particle size distribution measuring apparatus.

The step (II-b) is a step of drying the impregnated aqueous dispersion liquid to form the conductive polymer layer on the anode body. The drying in the step (II-b) can be performed under the same conditions as in the drying described in the step (iii-b). For example, the heating temperature in the step (II-b) may satisfy condition (1) and/or condition (2) described below.

(1) The heating temperature in the step (II-b) is a temperature equal to or higher than the boiling point of the aqueous dispersion liquid under the pressure for performing the drying in the step (II-b) and a temperature lower than the melting point of the hydroxyl group-containing compound (C) under the pressure for performing the drying in the step (II-b).

(2) The heating temperature in the step (II-b) is higher than the heating temperature in the step (I-b).

In this way, the conductive polymer layer (electrolyte layer) formed on the anode body (on the dielectric layer) is obtained. Thereafter, the cathode layer is formed on the conductive polymer layer (electrolyte layer). The cathode layer can be formed, for example, by applying a material constituting the cathode layer onto the electrolyte layer. In this way, the capacitor element is obtained. An electrolytic capacitor (second electrolytic capacitor) can be manufactured using this capacitor element. The method for manufacturing an electrolytic capacitor using a capacitor element is not particularly limited, and a known method can be applied.

Hereinafter, an example of the electrolytic capacitor according to the present disclosure will be specifically described with reference to the drawings; however, the electrolytic capacitor of the present disclosure is not limited to the following drawings. The above-described constituent elements can be applied to constituent elements of the electrolytic capacitor as the example to be described below. The constituent elements of the electrolytic capacitor as the example to be described below can be changed based on the above-described description. Matters to be described below may be applied to the above-described exemplary embodiment. Similar parts will be denoted by the common reference marks and redundant description may be omitted.

First Exemplary Embodiment

Figure 1:
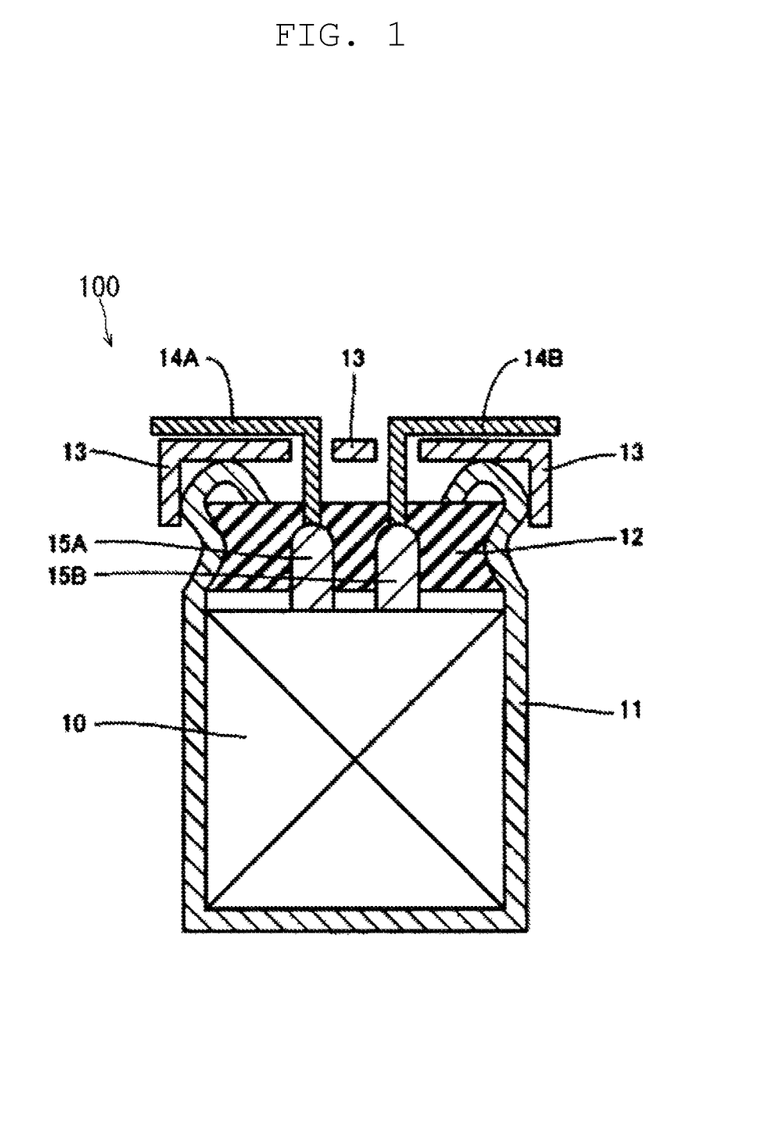
FIG. 1 is a sectional view schematically illustrating an example of an electrolytic capacitor according to the present disclosure.
Figure 2:
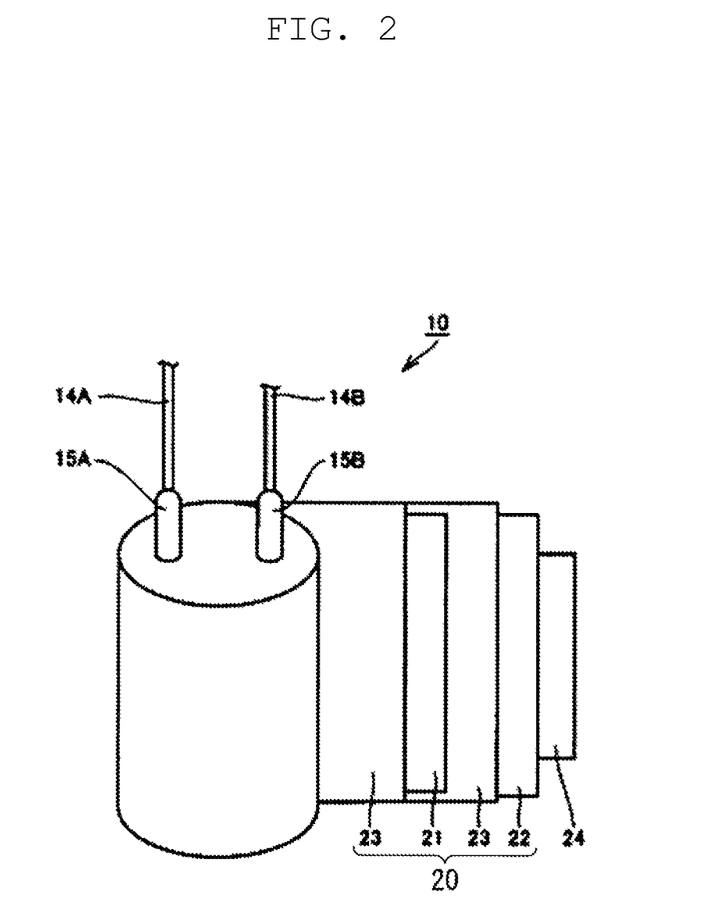
FIG. 2 is a view schematically illustrating a part of the electrolytic capacitor illustrated in FIG. 1.

In the first exemplary embodiment, an example of the first electrolytic capacitor will be described. FIG. 1 schematically illustrates a cross-section of an example of electrolytic capacitor 100 of the first exemplary embodiment. FIG. 2 is a schematic view of a partially developed capacitor element included in electrolytic capacitor 100 illustrated in FIG. 1.

As illustrated in FIG. 1, electrolytic capacitor 100 includes, for example, capacitor element 10, bottomed case 11 that houses capacitor element 10, sealing member 12 that closes an opening of bottomed case 11, seat plate 13 that covers sealing member 12, lead wires 14A and 14B led out from sealing member 12 and penetrating seat plate 13, lead tabs 15A and 15B (not illustrated) respectively connecting lead wires 14A and 14B and electrodes of capacitor element 10. Capacitor element 10 is housed in bottomed case 11. When capacitor element 10 contains the liquid component (L), the liquid component (L) is also housed in bottomed case 11. Bottomed case 11 is, at a part near an opening end, processed inward by drawing, and is, at the opening end, curled to swage sealing member 12.

Capacitor element 10 includes anode body 21 having a dielectric layer on a surface of the anode body, cathode body 22, and separator 23 disposed between the anode body and the cathode body. These constitute electrode group (wound body) 20. Capacitor element 10 includes an electrolyte layer (not illustrated) disposed between anode body 21 and cathode body 22. Anode body 21 and cathode body 22 are wound with separator 23 disposed between the anode body and the cathode body. The outermost circumference of the wound body is fixed with winding stop tape 24. FIG. 2 illustrates the wound body that is partially developed before the outermost circumference of the wound body is fixed.

The electrolyte layer has an unevenly distributed portion in which the hydroxyl group-containing compound (C) is unevenly distributed much at both ends in a winding axis direction of the wound body and at an outermost circumference portion of the wound body.

Second Exemplary Embodiment

Figure 3:
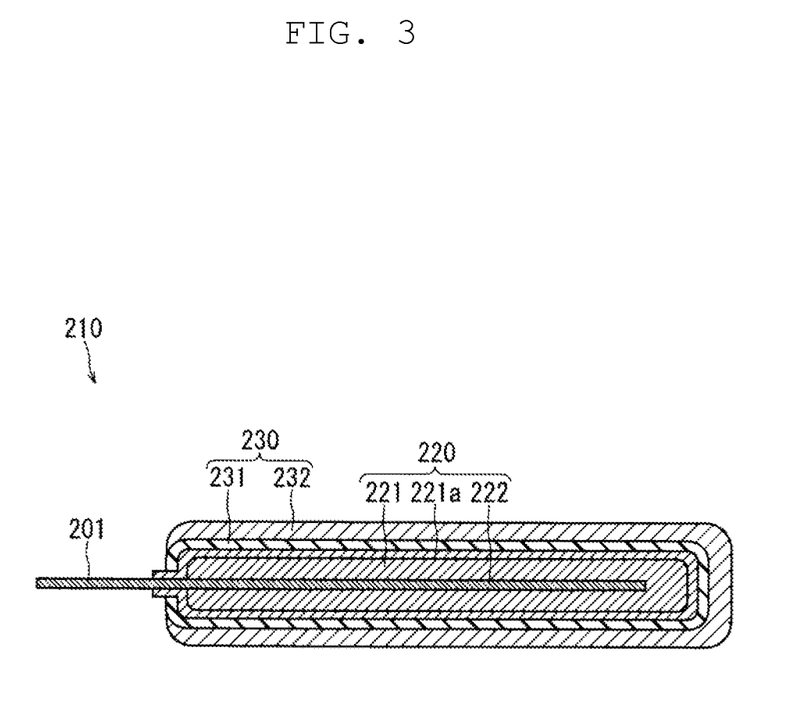
FIG. 3 is a sectional view schematically illustrating a part of another example of the electrolytic capacitor according to the present disclosure.

In the second exemplary embodiment, an example of the capacitor element included in the second electrolytic capacitor will be described. FIG. 3 schematically illustrates a cross-section of capacitor element 210 of the electrolytic capacitor according to the second exemplary embodiment.

Capacitor element 210 includes anode part 220 and cathode part 230. Anode part 220 includes anode body 221 and anode wire 222. Anode body 221 includes dielectric layer 221a formed on a surface of the anode body. A part of anode wire 222 is embedded in anode body 221. Cathode part 230 has electrolyte layer (for example, solid electrolyte layer) 231 covering at least a part of dielectric layer 221a and cathode layer 232 covering electrolyte layer 231.

Anode wire 222 is constituted by a conductive material. The material for anode wire 222 is not particularly limited, and may be the valve metal described above or may be other metals (such as copper, aluminum, and an aluminum alloy).

In an example of the production of anode part 220, first, in a state where a part of anode wire 222 is embedded in a metal powder (raw material for anode body 221), the powder is pressure-molded in a rectangular parallelepiped shape. Next, the powder is sintered. In this way, anode body 221 before dielectric layer 221a is formed is obtained. The method for forming dielectric layer 221a is not limited, and dielectric layer 221a may be formed by a known method. Dielectric layer 221a may be formed by immersing anode body 221 in an anodizing solution to anodize the surface of anode body 221. Alternatively, dielectric layer 221a may be formed by heating anode body 221 in an atmosphere containing oxygen.

The methods for forming electrolyte layer 231 and cathode layer 232 are not limited, and electrolyte layer 231 and cathode layer 232 may be formed by the above-described method or a known method.

Capacitor element 210 is subjected to lead wire connection, sealing with an insulating material (for example, an insulating resin), and the like as necessary. A known technique can be applied without limitation thereto. In this way, the second electrolytic capacitor is obtained.

EXAMPLES

Hereinafter, an exemplary embodiment of the present disclosure will be described in more detail by means of Examples. In this Example, a plurality of electrolytic capacitors (capacitors A1 and A2 and capacitors C1 to C4) were produced and evaluated. The methods for manufacturing and evaluating these capacitors will be described below. In the description of the method for producing a capacitor of Comparative Example, conditions different from the conditions of the step (ii) and the step (iii) described above may be used, but for convenience, these are also described as the step (ii) and the step (iii).
[Production of Capacitor A1]

A capacitor A1 is a wound-type electrolytic capacitor (diameter 10 mm×length 10 mm) having a rated voltage of 35 V and a rated capacitance of 270 μF. The capacitor A1 was produced by the following procedure.
(Preparation of Cathode Body)

An aluminum foil (Al foil) having a thickness of 50 μm was used for the cathode body.
(Preparation of Anode Body)

An Al foil having a thickness of 120 μm was prepared. The Al foil was subjected to a direct current etching treatment to roughen a surface. Next, the Al foil was subjected to an anodizing treatment to form a dielectric layer (thickness: about 70 nm), thereby obtaining an anode body. A dielectric layer was formed by performing an anodizing treatment at 70° C. for 5 hours while applying a voltage of 50 V to the Al foil with the Al foil immersed in an ammonium adipate solution. Then, the anode body was cut into a predetermined size to prepare an anode body of the capacitor A1.

(Production of Wound Body (Step (i)))

An anode lead tab and a cathode lead tab to which a lead wire was connected were connected to the prepared anode body and cathode body, respectively. The anode body and the cathode body were wound with the separator interposed between the anode body and the cathode body, and the outer surface was fixed with a winding stop tape. As the separator, a nonwoven fabric made of aramid (aromatic polyamide fiber) which is a synthetic fiber was used. In this way, a wound body (capacitor element precursor) was produced. A dielectric layer was formed mainly on an end surface of the anode body by performing a re-anodizing treatment at 70° C. for 60 minutes while applying a voltage of 50 V to the anode body with the produced wound body immersed in an ammonium adipate solution.

(Preparation of Aqueous Treatment Solution)

A mannitol aqueous solution having a concentration of 10 mass % was prepared by dissolving mannitol in ion-exchanged water. The viscosity of the obtained mannitol aqueous solution was measured and found to be 5 mPa·s or less.

(Preparation of Aqueous Dispersion Liquid)

By dissolving 3,4-ethylenedioxythiophene and polystyrenesulfonic acid as a dopant in ion-exchanged water, these mixed solution was prepared. While the obtained mixed solution was being stirred, iron(III) sulfate (oxidant) that had been dissolved in ion-exchanged water was added to the mixed solution to cause a polymerization reaction. After the reaction, the obtained reaction solution was dialyzed to remove unreacted monomers and an excessive oxidant, thereby obtaining a dispersion liquid (aqueous dispersion liquid) containing poly(3,4-ethylenedioxythiophene) doped with about 5 mass % of polystyrenesulfonic acid (PSS). Hereinafter, poly(3,4-ethylenedioxythiophene) doped with about 5 mass % of polystyrenesulfonic acid (PSS) may be referred to "PEDOT:PSS". The dispersion liquid in which PEDOT:PSS is dispersed may be referred to "PEDOT:PSS dispersion liquid". The aqueous dispersion liquid having a concentration of PEDOT:PSS of 2 mass % was prepared using this PEDOT:PSS dispersion liquid. The viscosity of the obtained dispersion liquid was measured and found to be 25 mPa·s.

(Step (ii))

First, the aqueous treatment solution was disposed in a container. Next, a wound body (capacitor element precursor) was immersed in the aqueous treatment solution in the container for 5 minutes at room temperature in an atmospheric pressure atmosphere. At this time, the wound body was immersed in the aqueous treatment solution from the side to which the lead tab was not connected (the same applies to another immersion step described below). Then, the wound body was pulled up from the aqueous treatment solution. In this way, the wound body was impregnated with the aqueous treatment solution. Then, the wound body was dried in a drying furnace having a pressure of 1 atm at 125° C. for 30 minutes, thereby drying the aqueous treatment solution. In this way, mannitol that is the hydroxyl group-containing compound (C) was disposed inside the wound body.

When the wound body was developed and the electrolyte layer was observed, mannitol was unevenly distributed and precipitated much at places corresponding to both ends in the axial direction of the wound body and at a place corresponding to the outermost circumference portion of the wound body. That is, the electrolyte layer had an unevenly distributed portion in which mannitol is unevenly distributed much at both ends in the winding axis direction of the wound body and at an outermost circumference portion of the wound body.

(Step (iii))

First, the aqueous dispersion liquid was disposed in a container. Next, the wound body was immersed in the aqueous dispersion liquid in the container for 15 minutes at room temperature in a reduced pressure atmosphere (40 kPa), and then the wound body was pulled up from the aqueous dispersion liquid. In this way, the wound body was impregnated with the aqueous dispersion liquid. Then, the wound body was dried in a drying furnace having a pressure of 1 atm at 150° C. for 30 minutes. Thus, the aqueous dispersion liquid was dried. In this way, the conductive polymer layer was formed.

(Impregnation with Electrolytic Solution)

After the step (iii), the wound body was impregnated with the electrolytic solution at room temperature in an atmospheric pressure atmosphere. As the electrolytic solution, a solution obtained by mixing polyethylene glycol, γ-butyrolactone, sulfolane, and mono(ethyldimethylamine) phthalate (solute) at a mass ratio of polyethylene glycol:γ-butyrolactone:sulfolane:mono(ethyldimethylamine) phthalate=25:25:25:25 was used.

In this way, the capacitor element including the electrolyte layer was obtained. This capacitor element was sealed to complete the electrolytic capacitor. Then, an aging treatment was performed at 130° C. for 2 hours while rated voltage was being applied. In this way, capacitor A1 was obtained.

[Capacitor A2]

Capacitor A2 was produced under the same conditions as in capacitor A1, except that the separator was changed. Cellulose-based natural fibers was used in the separator.

[Capacitor C1]

Capacitor C1 was produced under the same conditions as in capacitor A1, except that the step (ii) was not performed and the conditions of the step (iii) were changed.

In the step (iii) of capacitor C1, mannitol was dissolved in the PEDOT:PSS dispersion liquid described in the production of capacitor A1 to prepare the aqueous dispersion liquid. The concentration of PEDOT:PSS of the aqueous dispersion liquid was set to 2 mass %, and the concentration of mannitol was set to 10 mass %. The viscosity of the obtained dispersion liquid was measured and found to be 45 mPa·s.

Impregnation was performed using this aqueous dispersion liquid under the same conditions as in the step (iii) of capacitor A1.

Then, the wound body was dried in a drying furnace at 60° C. for 30 minutes, and subsequently dried at 125° C. for 15 minutes. Thus, the aqueous dispersion liquid was dried. In this way, the conductive polymer layer was formed. Then, capacitor C1 was produced by the same process as in capacitor A1.

[Capacitor C2]

Capacitor C2 was produced under the same conditions as in capacitor A1, except that the temperature during drying in the step (ii) and the temperature and time during drying in the step (iii) were changed.

In the step (ii) of capacitor C2, drying was performed at 180° C. for 30 minutes. In the step (iii) of capacitor C2, drying was performed at 60° C. for 30 minutes, and subsequently drying was performed at 125° C. for 15 minutes.

[Capacitor C3]

Capacitor C3 was produced under the same conditions as in capacitor C2, except that the step (ii) was not performed.

[Capacitor C4]

Capacitor C4 was produced under the same conditions as in capacitor C2, except that the separator was changed. Cellulose-based natural fibers was used in the separator.

(Evaluation of Mannitol Distribution)

Figure 4A:
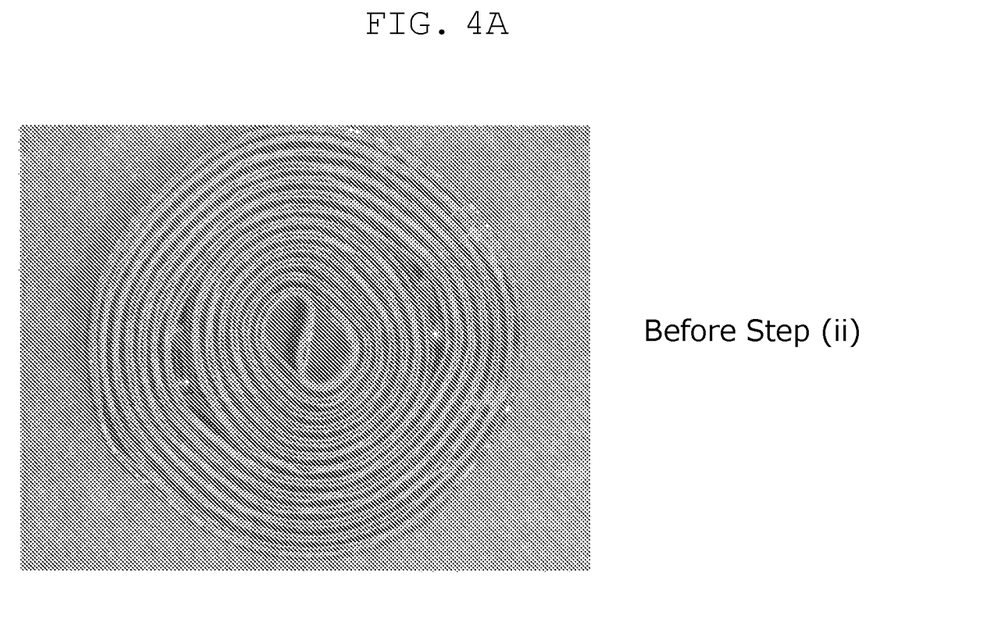
FIGS. 4A to 4C are views showing results of Examples.
Figure 4B:
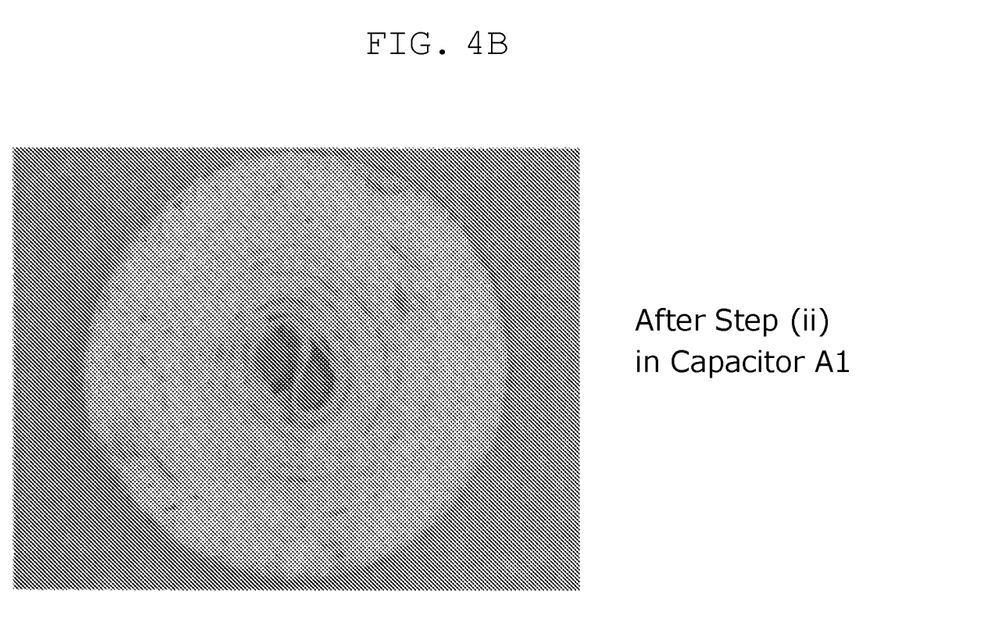
Figure 4C:
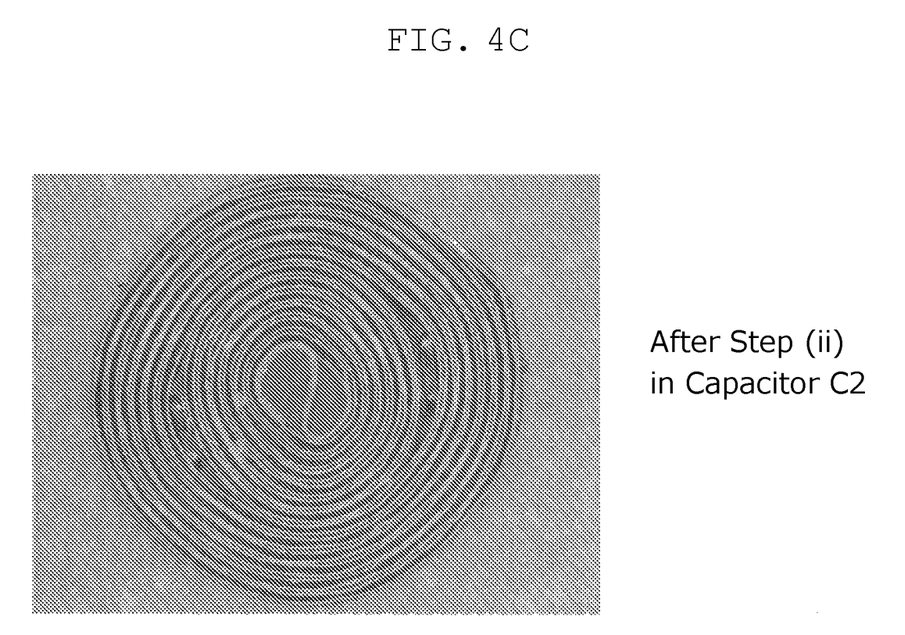

For the wound body produced in the step (i) of capacitor A1 (the capacitor element precursor before the step (ii) was performed), the axial end surface of the wound body was visually observed. A photograph of the end surface is shown in FIG. 4A. For capacitor A1 and capacitor C2, the end surfaces of the wound bodies were visually observed after each step (ii) was performed. Photographs of these end surfaces are shown in FIGS. 4B and 4C. As shown in FIGS. 4A to 4C, when the step (ii) of capacitor A1 was performed, mannitol (shown in white) was unevenly distributed much on the end surface of the wound body. This precipitated portion was present at both ends of the wound body. On the other hand, after the step (ii) of capacitor C2, such uneven distribution was not observed.

The three wound bodies were disassembled to observe the electrolyte held by the separator. In the electrolyte after the step (ii) of capacitor A1, mannitol was unevenly distributed much in portions corresponding to both ends in the winding axis direction of the wound body and in a portion corresponding to the outermost circumference portion of the wound body. On the other hand, in the electrolyte after the step (ii) of capacitor C2 was performed, such uneven distribution was not observed.

Steps up to the step (ii) were performed by the same method as the method for producing each capacitor described above. Then, the wound body (capacitor element precursor) had undergone the step (ii) was decomposed, and the distribution of mannitol in the electrolyte layer was examined. Specifically, the identification of mannitol was performed using a microscopic FT-IR analyzer (Nicolet-iN10 manufactured by Thermo Fisher Scientific). Regarding the distribution ratio of mannitol, first, an end portion of the capacitor element and a central portion of the capacitor element were separated, and mannitol attached to each of the end portion and the central portion of the capacitor element was extracted with a water solvent. Then, the dry weight of mannitol present in each portion was determined. The distribution ratio of mannitol was determined from this dry weight. Similarly, steps up to the step (iii) was performed by the same method as the method for producing each capacitor described above, and the distribution ratio of mannitol in the electrolyte layer was determined.

(Evaluation of Characteristics)

The equivalent series resistance (ESR) of the electrolytic capacitor produced as described above was measured. ESR was measured using an LCR meter for four-terminal measurement in an environment of 20° C. The breakdown withstand voltage was measured in such a manner that a voltage was applied to the electrolytic capacitor while increasing a voltage at a rate of 1.0 V/s, and the breakdown withstand voltage at which an overcurrent of 0.5 A flows was measured.

Thirty capacitors of each of six kinds of capacitors described above were produced and applied with a rated voltage of 35 V in an environment of 150° C., and presence or absence of a short circuit was checked after 60 minutes. How many capacitors among the thirty capacitors were short-circuited was evaluated.

The measurement results and some of the manufacturing conditions of the electrolytic capacitor are shown in Table 1. In Table 1, "PEDOT:PSS mixed" means that the aqueous dispersion liquid is a dispersion liquid containing PEDOT:PSS and mannitol.

TABLE 1

| Capacitor | Separator | Step (ii-a) Treatment solution | Step (ii-b) Drying conditions | Distribution of mannitol after step (ii) Center: vertical end | Step (iii-a) Aqueous dispersion liquid |
|---|---|---|---|---|---|
| A1 | Synthetic | Mannitol | 125° C. for 30 minutes | 25:75 | PEDOT: PSS |
| A2 | Natural | Mannitol | 125° C. for 30 minutes | 25:75 | PEDOT: PSS |
| C1 | Synthetic | — | — | — | PEDOT: PSS mixed |
| C2 | Synthetic | Mannitol | 180° C. for 30 minutes | 50:50 | PEDOT: PSS |
| C3 | Natural | — | — | — | PEDOT: PSS |
| C4 | Synthetic | Mannitol | 180° C. for 30 minutes | 50:50 | PEDOT: PSS |

| Capacitor | Step (iii-b) Drying conditions | Distribution of mannitol after step (iii) Center: vertical end | ESR (mΩ) | Breakdown withstand voltage (V) | Number of short circuits |
|---|---|---|---|---|---|
| A1 | 150° C. for 30 minutes | 20:80 | 12 | 79 | 0/30 |
| A2 | 150° C. for 30 minutes | 20:80 | 17 | 75 | 0/30 |
| C1 | 60° C. for 30 minutes + 125° C. for 15 minutes | — | 22 | 69 | 2/30 |
| C2 | 60° C. for 30 minutes + 125° C. for 15 minutes | 50:50 | 10 | 70 | 0/30 |
| C3 | 60° C. for 30 minutes + 125° C. for 15 minutes | — | 29 | 60 | 6/30 |
| C4 | 60° C. for 30 minutes + 125° C. for 15 minutes | 50:50 | 15 | 71 | 0/30 |

The drying temperature of the step (ii-b) of capacitors A1 and A2 is equal to or higher than the boiling point of the aqueous treatment solution. The melting point of mannitol is about 165° C. to 169° C. Thus, the drying temperature of the step (ii-b) of capacitors A1 and A2 is equal to or higher than the boiling point of the aqueous treatment solution and lower than the melting point of mannitol (hydroxyl group-containing compound (C)). On the other hand, the drying temperature of the step (ii-b) of capacitors C2 and C4 is higher than the melting point of mannitol (hydroxyl group-containing compound (C)).

The ESR value is preferably low. The ESR value is preferably 20 mΩ or less (for example, in a range from 3 mΩ to 20 mΩ, inclusive) and more preferably 12 mΩ or less (for example, in a range from 3 mΩ to 12 mΩ, inclusive). The breakdown withstand voltage is preferably high, and is preferably 75 V or more (for example, in a range from 75 V to 100 V, inclusive). The number of short circuits is preferably small.

As shown in Table 1, capacitors A1 and A2 of the present disclosure were good in all characteristics of ESR, the breakdown withstand voltage, and the number of short circuits. The reason why ESR is low is considered that the electrolyte layer contains mannitol (hydroxyl group-containing compound (C)). The reason why the breakdown withstand voltage and the number of short circuits are low is considered that mannitol is unevenly distributed much at both ends in the winding axis direction of the wound body and at the outermost circumference portion of the wound body.

When capacitor C2 using the separator made of synthetic fibers and capacitor C3 using the separator made of natural fibers were compared with each other, the breakdown withstand voltage and the number of short circuits were significantly deteriorated in capacitor C3 using the separator made of natural fibers. On the other hand, there was no large difference between capacitor A1 and capacitor A2. The reason for this is considered that the separator is reinforced by performing the step (ii).

The present disclosure relates to an electrolytic capacitor and a method for manufacturing an electrolytic capacitor.

What is claimed is:

1. An electrolytic capacitor comprising a capacitor element, wherein:
    the capacitor element includes:
        an electrode group that includes an anode body, a cathode body, and a separator, the anode body and the cathode body each having a foil shape, the anode body having a dielectric layer on a surface of the anode body, and
        an electrolyte layer that is in contact with the anode body, the cathode body, and the separator,
    the electrode group is a wound body in which the anode body and the cathode body facing each other are wound with the separator interposed between the anode body and the cathode body, or a laminate in which the anode body and the cathode body facing each other are laminated with the separator interposed between the anode body and the cathode body,
    the electrolyte layer contains a conductive polymer and a hydroxyl group-containing compound having a melting point of 50° C. or higher, the hydroxyl group-containing compound being at least one compound selected from the group consisting of a sugar and a polyhydric alcohol,
    the hydroxyl group-containing compound is unevenly distributed more in a peripheral portion of the capacitor element than in a central portion of the capacitor element, and
    the conductive polymer is unevenly distributed more in the peripheral portion of the capacitor element than in the central portion of the capacitor element.

2. The electrolytic capacitor according to claim 1, wherein:
    the electrode group is the wound body, and
    in the electrolyte layer, the hydroxyl group-containing compound is unevenly distributed more at both ends in a winding axis direction of the wound body and at an outermost circumference portion of the wound body than at a central portion of the wound body.

3. The electrolytic capacitor according to claim 1, wherein:
    the electrode group is the laminate, and
    in the electrolyte layer, the hydroxyl group-containing compound is unevenly distributed more at a portion in contact with a peripheral portion of the anode body than at a central portion of the laminate.

4. The electrolytic capacitor according to claim 1, wherein the electrolyte layer contains a non-aqueous solvent or a non-aqueous electrolytic solution.

5. The electrolytic capacitor according to claim 1, wherein the hydroxyl group-containing compound is at least one selected from the group consisting of glucose, mannitol, sorbitol, xylitol, pentaerythritol, and trimethylolpropane.

6. The electrolytic capacitor according to claim 1, wherein the conductive polymer is poly(3,4-ethylenedioxythiophene) doped with polystyrenesulfonic acid.

7. The electrolytic capacitor according to claim 1, wherein the hydroxyl group-containing compound is at least one selected from the group consisting of glucose, mannitol, xylitol, pentaerythritol, and trimethylolpropane.

8. An electrolytic capacitor comprising a capacitor element, wherein:
    the capacitor element includes an anode body, a cathode layer, and an electrolyte layer, the anode body being porous and having a dielectric layer on a surface of the anode body, the electrolyte layer being disposed between the anode body and the cathode layer,
    the capacitor element contains a conductive polymer and a hydroxyl group-containing compound having a melting point of 50° C. or higher, the hydroxyl group-containing compound being at least one compound selected from the group consisting of a sugar and a polyhydric alcohol,
    the hydroxyl group-containing compound is unevenly distributed more in a peripheral portion of the anode body than in a central portion of the anode body, and
    the conductive polymer is unevenly distributed more in the peripheral portion of the anode body than in the central portion of the anode body.

9. The electrolytic capacitor according to claim 8, wherein the hydroxyl group-containing compound is at least one selected from the group consisting of glucose, mannitol, sorbitol, xylitol, pentaerythritol, and trimethylolpropane.

10. The electrolytic capacitor according to claim 8, wherein the conductive polymer is poly(3,4-ethylenedioxythiophene) doped with polystyrenesulfonic acid.

11. The electrolytic capacitor according to claim 8, wherein the hydroxyl group-containing compound is at least one selected from the group consisting of glucose, mannitol, xylitol, pentaerythritol, and trimethylolpropane.

* * * * *